Oct. 9, 1962   A. W. HAYDON ET AL   3,058,017
MOTOR SPEED GOVERNOR UNIT FOR CORDLESS CLOCKS AND THE LIKE
Filed March 17, 1958   4 Sheets-Sheet 1

INVENTORS.
Arthur W. Haydon
BY Charles S. Daniels
Phillip W. King

ATTORNEYS

Oct. 9, 1962  A. W. HAYDON ET AL  3,058,017
MOTOR SPEED GOVERNOR UNIT FOR CORDLESS CLOCKS AND THE LIKE
Filed March 17, 1958  4 Sheets-Sheet 2

INVENTORS.
Arthur W. Haydon
BY Charles S. Daniels
Phillip W. King

ATTORNEYS

Oct. 9, 1962   A. W. HAYDON ET AL   3,058,017
MOTOR SPEED GOVERNOR UNIT FOR CORDLESS CLOCKS AND THE LIKE
Filed March 17, 1958   4 Sheets-Sheet 3

INVENTORS.
Arthur W. Haydon
BY Charles S. Daniels
Phillip W. King

*Pennie Edmonds, Morton, Barrows & Taylor*

ATTORNEYS

Oct. 9, 1962 A. W. HAYDON ET AL 3,058,017
MOTOR SPEED GOVERNOR UNIT FOR CORDLESS CLOCKS AND THE LIKE
Filed March 17, 1958
FIG. 5
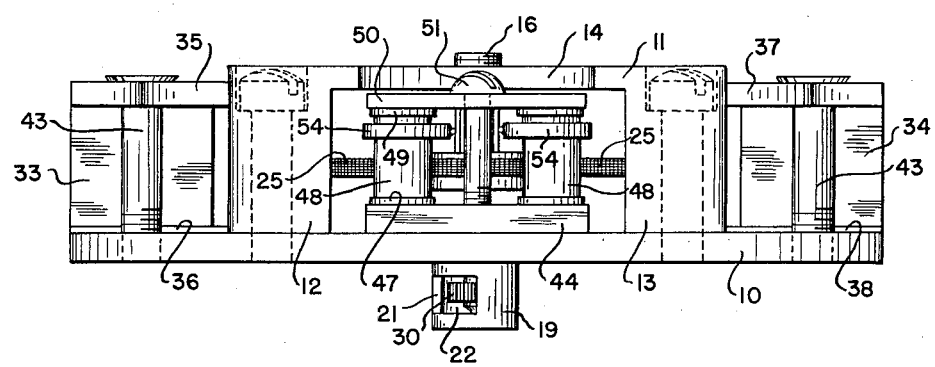
FIG. 6
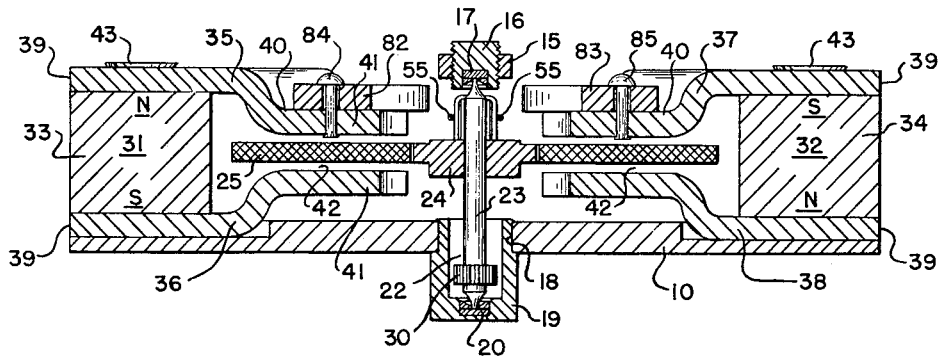
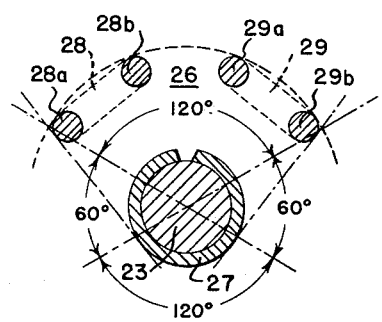
FIG. 8
INVENTORS.
Arthur W. Haydon
BY Charles S. Daniels
Phillip W. King
ATTORNEYS United States Patent Office 3,058,017
Patented Oct. 9, 1962

3,058,017
MOTOR SPEED GOVERNOR UNIT FOR CORDLESS CLOCKS AND THE LIKE
Arthur W. Haydon, Milford, Charles S. Daniels, Woodbury, and Phillip W. King, Meriden, Conn., assignors to Consolidated Electronics Industries Corp., Waterbury, Conn., a corporation of Delaware
Filed Mar. 17, 1958, Ser. No. 721,706
21 Claims. (Cl. 310—68)

The present invention relates to motor speed governor units, particularly of the type described and claimed in the United States Patents No. 2,523,298 and Re. 24,310, issued to Arthur W. Haydon. More specifically, the invention is directed to improvements in motor-governor units of the type referred to, to the end that the units are highly efficient and dependable in operation, capable of economical manufacture and servicing, and readily adaptable to a variety of uses, one of the most important of which is in the operation of so-called cordless (i.e., battery operated) clocks. The present invention is closely related to the invention described and claimed in the co-pending application of Arthur W. Haydon, Ser. No. 721,-795, filed March 17, 1958, for "Electric Motor."

The above-identified United States patents of Arthur W. Haydon relate to motor speed governor arrangements in which a motor is adapted, when energized, to operate at a speed higher than desired. Highly accurate governing of the motor speed is effected by providing a motor energization circuit including contact means adapted to open cyclically at instants determined by the travel of the motor and to close cyclically at instants determined by the operation a constant speed device, such as a balance wheel. Such motor-governor units, which may be referred to herein as Haydon units, have been found to be accurate and dependable, and thus well suited for operating timing devices, such as clocks. The present invention, although not necessarily thus limited, is directed to specific improvements in Haydon governor units of known design, adapting such units for mass manufacture at low cost and for extended operation (i.e., several years) from readily available energy sources, such as small, dry cell batteries, whereby the units are rendered especially suitable for the operation of cordless clocks and like devices.

The improved motor-governor unit is advantageously of the type described and claimed in the co-pending application of Arthur W. Haydon, in that a motor is provided with eccentric commutator means arranged to effect the cyclical displacement of resiliently mounted brushes, and governing of the motor speed is accomplished by a constant speed device which prevents return movement of a displaced brush until a predetermined instant in the cycle of the constant speed device.

One of the specific features of the invention resides in the provision of a motor-governor unit which incorporates improved constant speed means adapted to operate with superior uniformity and accuracy, and with a minimum input of energy. The improved constant speed device comprises a balance wheel adapted for oscillation at a known frequency and arranged to actuate a member, such as a pallet lever, between two operative positions, in which the member functions to hold a contact member in circuit opening position. The arrangement of the present invention is similar to that of the Haydon United States Patent No. 2,523,298, in that magnetic means is provided to assist in holding a pallet lever in its operative positions, but is an improvement over the patented arrangement in respect of a novel arrangement of magnetic means requiring minimum energy for effecting release of the pallet lever at desired times and assuring uniformity of operation over extended periods of operation.

Another specific feature of the invention resides in the provision, in a motor-governor unit of the general type above described, of improved means forming brushes for operating the motor and effecting the governing of its speed. The improved brush means comprises a novel arrangement for mounting the brushes, to accommodate displacement thereof by an eccentric commutator, and a novel brush structure in which a brush contact is formed of a precious metal, such as gold alloy, to provide optimum electrical characteristics.

The new motor-governor unit also includes various novel and improved structural characteristics providing for efficient manufacture and servicing and also providing a motor-governor device in the form of a modular unit or package. The modular unit is arranged for cooperation with a modular form of driven unit, such as a clock works, for example, in such a manner that the units may simply be attached to each other, and either unit may be readily replaced or interchanged.

For a better understanding of the invention, reference should be made to the following detailed description, and to the accompanying drawing, in which:

FIG. 5 is a bottom view of the unit of FIG. 1;

FIG. 6 is a cross-sectional view taken generally along line 6—6 of FIG. 1;

FIG. 8 is an enlarged cross-sectional representation of an eccentric motor commutator incorporated in the unit of FIG. 1.

Figure 1:
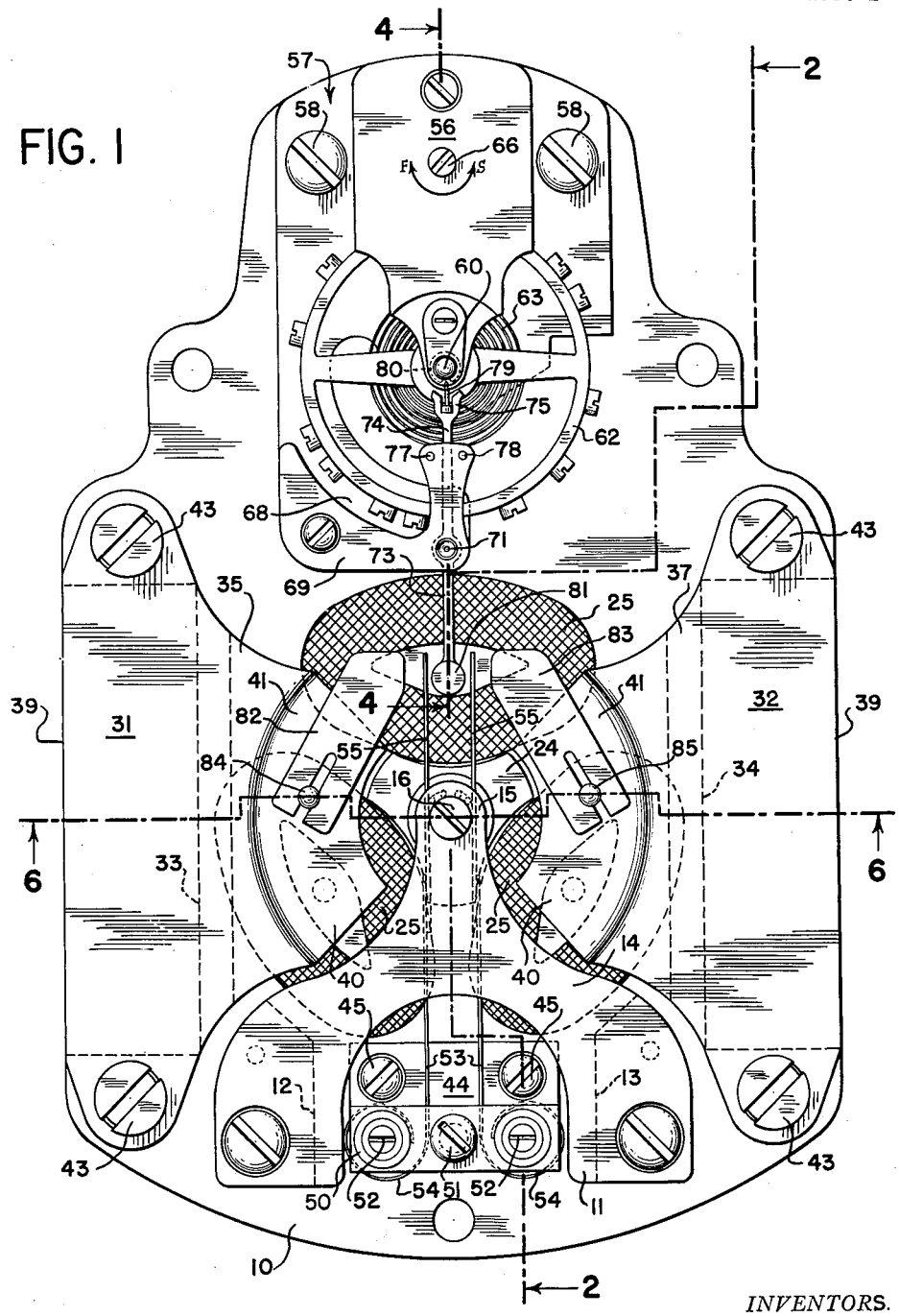
FIG. 1 is an elevational view of a motor-governor unit incorporating the features of the invention.

Referring now to the drawing, the reference numeral 10 designates a base plate, forming part of a frame for the motor-governor unit. Mounted near the lower end of the plate 10 is a bridge 11, which may be referred to as a rotor bridge and has a pair of spaced legs 12, 13 (FIG. 5) and a spanning portion 14 extending between the legs. The spanning portion is generally in the form of an inverted V, having its apex 15 centrally between and substantially above the legs 12, 13, and the apex portion mounts a bearing member 16, which advantageously carries a suitable jewel 17.

Figure 7:
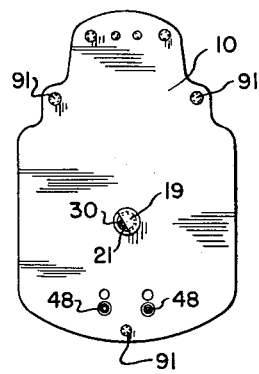
FIG. 7 is a back view of the unit of FIG. 1.

Directly opposite the bearing 16, the base plate 10 is provided with an opening 18, in which is received a combined bushing and bearing member 19, carrying a jewel 20. The bushing 19 is secured in the opening 18 and has a cylindrical portion projecting outward of the base plate. The outer end of the bushing is closed, but a portion of the bushing is cut away, as indicated at 21 in FIG. 7, to expose an interior recess 22, the cut-away portion advantageously covering less than half of the cylindrical outline of the bushing.

Supported and journalled by the jewels 17, 20 is a shaft 23, which mounts a hub 24 supporting a plurality of coils 25. The shaft, hub and coils form the rotor of a motor, and the coils of the motor are connected appropriately to an eccentric commutator 26. The eccentric commutator 26 advantageously is in the form represented in FIG. 8, which illustrates a first commutator segment 27 in the form of a split collar mounted on and concentric with the rotor shaft 23 and second and third commutator segments 28, 29, each consisting of legs 28a, 28b and 29a, 29b of U-shaped wire elements. The several segments are advantageously formed of a material, such as a gold alloy, having desirable contact characteristics, and the segments 28, 29 outline an arc of about 120° concentric with the rotor shaft 23 and having a radius about twice that of the collar 27. The effective surface portion of the collar is that which lies between lines tangent to the collar and to the outer portions of wire elements 28a and 29b, and is about 120°.

Figure 2:
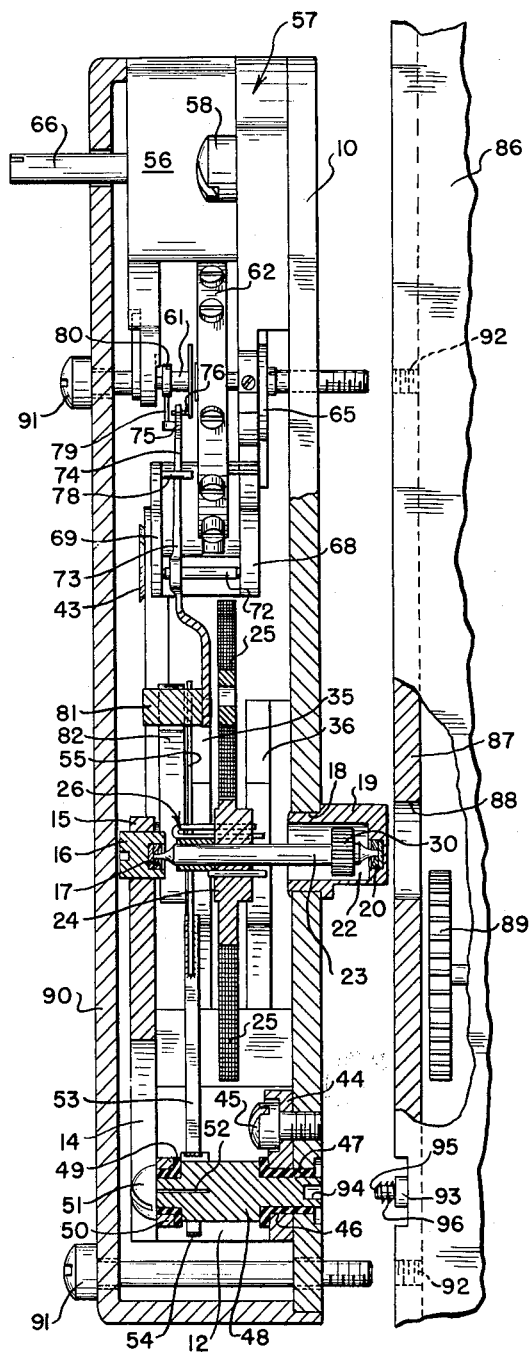
FIG. 2 is a cross-sectional view taken generally along line 2—2 of FIG. 1, showing a cover in place on the unit and illustrating the manner in which the unit is assembled with a mechanism, such as a clock works.

In the illustrated motor-governor unit, the rotor shaft 23 constitutes the output means, and is provided at one end with a drive pinion 30. The pinion 30, as shown in FIGS. 2 and 6, is received in the recess 22 of the bushing 19 and has a portion exposed at the cut-out 21. As will be described in greater detail, the drive pinion is adapted to be engaged with gears of a driven mechanism, such as a clock works, to operate the mechanism at a governed speed.

Secured to the base plate 10, on opposite sides of the rotor axis or rotor shaft, are stator magnets 31, 32. The stator magnets are of improved form and comprise permanent magnet bars 33, 34 engaged on opposite sides by pole extension pieces 35, 36 and 37, 38. As shown in FIGS. 1 and 6, the magnet bars 33, 34 are parallel and extend at right angles to the rotor shaft 23, and the polarization of the bars is such that the north and south poles face in opposite directions parallel to the rotor shaft. The bars are also reversed, one with respect to the other, so that the north pole, for example, of the bar 33 faces in the same direction as the south pole of the bar 34. Advantageously, the magnet bars 33, 34 are formed of a polarized ceramic material, such as Indox I, manufactured by Indiana Steel Products Company, or Ferroxdure, manufactured by N. V. Philips.

The pole extension pieces 35—38 may be substantially identical, and each comprises a contact portion 39 adapted to overlie a polar surface of a magnet bar, a neck portion 40, of narrowing width, extending toward the rotor shaft, and pole pieces 41 of arcuate shape overlying and facing an end surface of the rotor. As will be observed in FIG. 6, the thickness of the magnet bars 33, 34 is substantially greater than that of the effective portion (coils) of the rotor and, accordingly, the arcuate pole pieces 41 are offset toward the rotor to form an air gap 42 in which the rotor coils 25 are closely received. And, advantageously, the offset portions forming the pole pieces 41 are so shaped and dimensioned (see FIG. 1) that the narrow air gap 42 does not lie outside the limits of the effective portions of the rotor, so that flux leakage across the gap is minimized.

In the illustrated form of the invention, the polar extension pieces 35—38 extend beyond the ends of the magnet bars 33, 34 and are provided with openings receiving screws 43. The screws 43 engage the base plate 10 and serve to clamp the pairs of extension pieces to the respective magnet bars and to secure the magnet assemblies to base plate. The extension pieces 36, 38, lying on the base plate, need not extend beyond the ends of the magnet bars but may do so where it is desirable to make all of the extension pieces of identical size and shape.

Near the bottom of the base plate 10 is an anchor assembly, including a socket plate 44 secured to the base plate by screws 45 and having spaced openings 46 therein aligned with similar openings in the base plate. Flanged insulating bushings 47 are received in the openings 46 and shouldered anchor posts 48 are received in the bushings, in insulated relation to the base plate. Flanged insulating bushings 49 are also applied to the outer ends of the anchor posts, and an anchor bridge 50 is received over the bushings 49 and is drawn toward the base plate by a screw 51. The anchor posts 48 are formed of conductive material and have end portions exposed through the back of the base plate 10, substantially as shown in FIGS. 1 and 2.

Advantageously, the outer ends of the anchor posts are provided with slots 52 for the reception of end portions of brush supports 53. The brush supports are formed of a spring-like, conductive material and have spiral end portions 54 making about one turn around the anchor posts. The unsupported ends of the brushes extend in spaced, generally parallel relation toward the commutator 26 and have mounted on their ends wire-like brush contact elements 55, which are advantageously formed of material, such as gold alloy, having desirable contact characteristics. The contact elements pass on opposite sides of and extend a substantial distance above the commutator 26, as shown in FIG. 1, and the arrangement of the supports 53 is such that the contact elements are at all times urged toward the commutator and tend to follow its non-circular or eccentric outline during rotation of the rotor.

Figure 4:
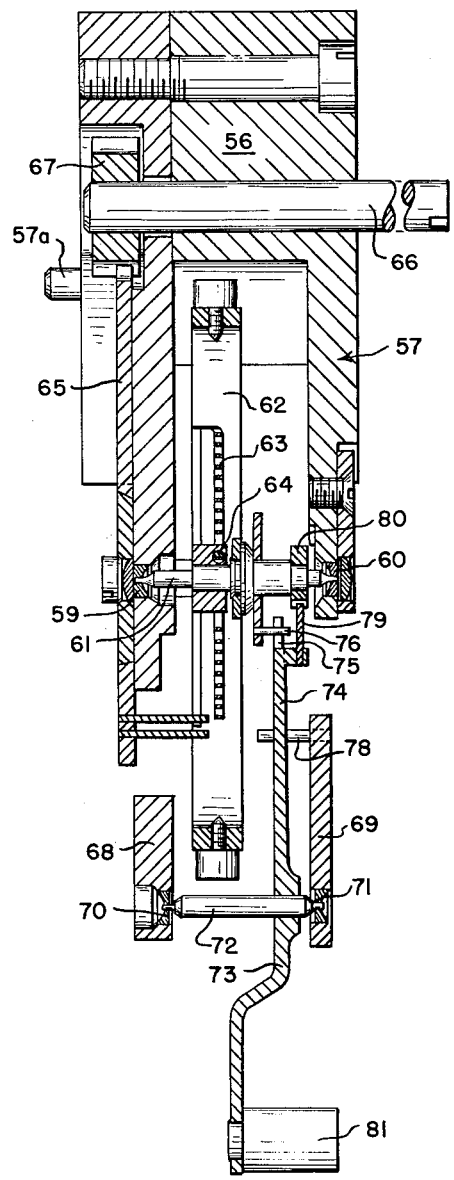
FIG. 4 is an enlarged, fragmentary, cross-sectional view taken generally along line 4—4 of FIG. 1.
Figure 3:
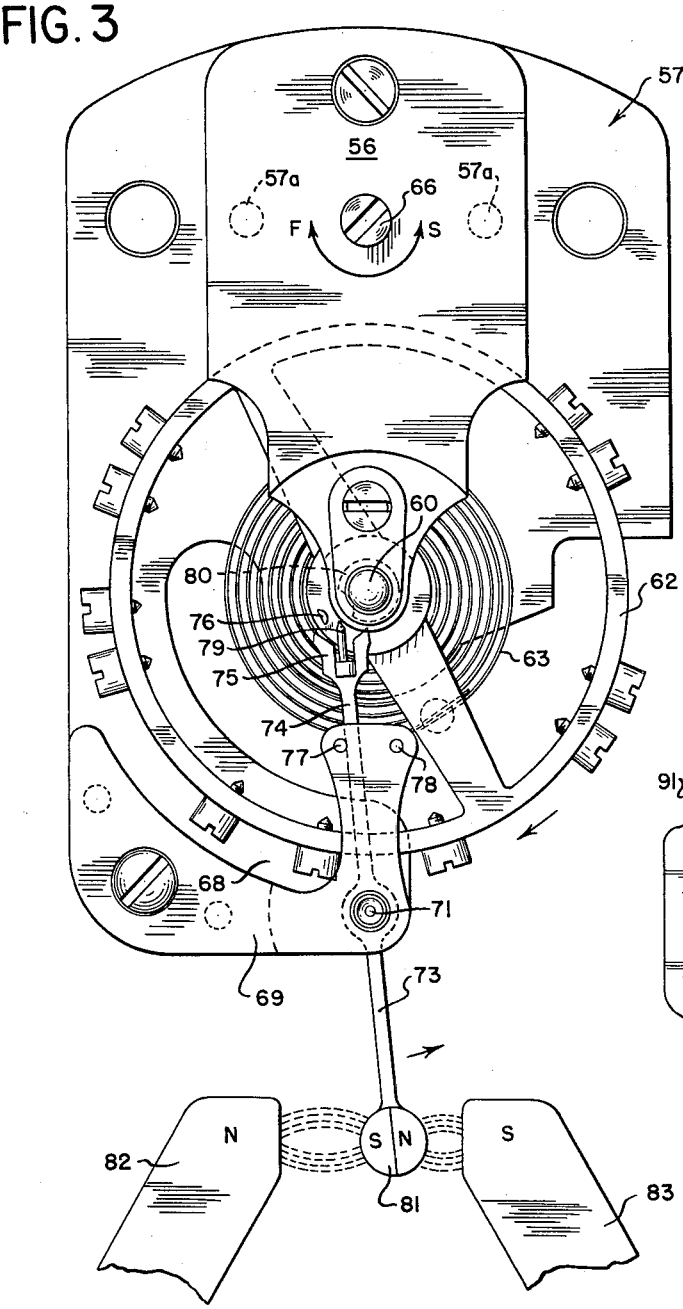
FIG. 3 is an enlarged view of the improved constant speed device incorporated in the unit of FIG. 1.

Mounted on the base plate 10, near its upper end, is a constant speed device 56, shown in detail in FIGS. 3 and 4, which is advantageously self-contained in a sub-frame 57 secured to the base plate 10 by screws 58, in conjunction with locating pins 57a received in accurately located openings in the base plate. The sub-frame 57 has jewel bearings 59, 60 journalling the shaft 61 of a balance wheel 62 which, in general, may be of conventional design. A suitable hairspring 63 is secured at one end to the balance wheel shaft, as at 64, and at its other end to the sub-frame, and an adjustable member 65, pivoted by a screwdriver-adjusted shaft 66 and pinion 67, regulates the effective length of the hairspring, in the usual manner, for regulating of the period of oscillation of the balance wheel.

The sub-frame 57 includes spaced arms 68, 69, located below the balance wheel, which have jewel bearings 70, 71 journalling the shaft 72 of a pallet lever 73. In the assembled unit, the axis of the pallet lever lies between the axes of the balance wheel 62 and the rotor shaft 23, and a portion 74 of the lever extends upward from its pivot axis and forms a yoke 75 adapted to be engaged by a pin 76 carried by the balance wheel shaft. As the wheel oscillates, the pallet lever is actuated between limit positions determined by the placement of banking pins 77, 78 projecting from the arm 69 of the sub-frame. The pallet lever also carries a pin 79, which cooperates in a known manner with a notched roller 80 to lock the pallet lever in its limit positions until actuated from one to the other by the pin 76.

Advantageously, the pallet lever 73 carries at its lower end an actuating arm 81, which is parallel to the axis of the pallet lever and is arranged to lie between the upper ends of the brush contact elements 55, substantially as shown in FIG. 1. The arrangement is such that, when the pallet lever is actuated to a limit position, as shown in FIG. 3, the arm 81 will engage the adjacent brush contact element, unless the element is displaced by the eccentric commutator 26 beyond the limit position of the arm 81.

In accordance with one specific aspect of the invention, the arm 81 carried by the pallet lever is formed of magnetic material, advantageously Indox I, and is polarized in a manner such that its opposite poles face generally in the direction of movement of the arm, i.e., at right angles to the pallet lever. In addition, means are provided adjacent the respective limit positions of the arm 81 tending, upon movement of the pallet lever to a limit position, to hold the lever in the limit position, against one of the banking pins 77, 78, independently of the locking action of the pin 79 and roller 80 and in a manner such that the pin 79 is kept out of contact with the disc 80 during normal operation of the device.

In accordance with another specific aspect of the invention, the magnetic means forming the stator is utilized for attracting the magnetic arm 81 to its limit positions. In this respect, the arm 81 is positioned generally between the outer polar extension pieces 35, 37, constituting north and south pole respectively, and the arm 81 is oriented so that its south pole faces the extension piece 35 and its north pole faces the extension piece 37.

Advantageously, the magnetic arm 81 is brought under the influence of appropriate poles of the stator magnets 31, 32 by the provision of bleeder elements 82, 83, which are secured to the polar extension pieces 35, 37 respectively, as by pins 84, 85. As shown in FIG. 1, the bleeder elements have split ends, which frictionally grip the pins 84, 85 and permit pivotal adjustment of the elements toward and away from the pallet lever arm 81.

The provision of a magnetic arm 81 on the pallet lever, arranged to cooperate with magnetic means of opposite polarity adjacent the limit positions of the arm, results in highly stable operating conditions which will not change significantly over long periods of operation. Separate magnetic fields are formed between the bleeder elements and the respective poles of the magnetic arm, substantially in the manner shown in FIG. 3 and since the magnetic forces are inversely propositional to the square of the distance it can be understood readily that a magnetic toggle action or detent results, which holds the opposite end 74 of the pallet lever 73 firmly against one or the other of the banking pins 77, 78 whereby the pin 79 is kept out of contact with the roller 80 to assure the free swing of the balance wheel 62.

In accordance with another specific aspect of the invention, the motor-governor unit thus described is arranged in the form of a modular unit, adapted to be "plugged-in" to a unit, such as a clock works, to be driven. Thus, in FIG. 2, the numeral 86 designates a housing or frame structure for a clock or other mechanism to be driven by the motor-governor unit. The frame 86 includes a base plate 87, provided with an opening 88 adapted to receive closely the bushing 19, and has means mounting an input gear 89 adjacent the opening, in a position to be engaged with the pinion 30, when the bushing 19 is inserted in the opening.

In the illustrated apparatus, the motor-governor unit is provided with a cover 90 which, together with the base plate 10, completely encloses the unit, and the cover and base plate have openings for receiving screws 91. The screws project beyond the base plate 10 for engagement with appropriately located threaded openings 92 in the plate 87 of the driven unit. Thus, the motor-governor and driven units may be assembled in working relation, by merely inserting the bushing 19 in the opening 88 and securing the units together by the screws 91.

Advantageously, the source of electrical potential for operating the motor-governor unit may be connected to plug connectors 93 projecting from the plate 87 of the driven unit and adapted, when the units are assembled in working relation, to engage and form electrical connections with the anchor posts 48. To this end, the posts 48 may have recesses 94 therein to receive reduced ends 95 of the connectors, and springs 96, of conductive material, may be provided to insure a good connection.

As explained in some detail in the co-pending application of Arthur W. Haydon, the motor-governor unit is set into operation by supplying current to the rotor, through the brush contacts 55, the current supply being such as to cause the motor to tend to operate at a speed higher than desired. Rotation of the commutator causes the brush contacts to be displaced from one side to the other and, during start-up, the contacts strike the pallet lever alternately on opposite sides imparting impulses of energy to the balance wheel to set the wheel in motion at its natural frequency.

When the motor reaches and tends to exceed a predetermined speed, at which the brush contacts 55 are displaced from side to side at the frequency of oscillation of the balance wheel, the constant speed mechanism begins to govern the operation of the motor. Thus, when the commutator rotates to a position displacing the contacts to the right, for example, the pallet lever is actuated to shift the arm 81 to its right hand limit position. Under the defined conditions, the motor tends to accelerate ahead of the constant speed mechanism, so that the commutator releases the right hand contact element before the pallet lever is actuated to its other limit position. Accordingly, upon release of the contact element by the commutator, the motor circuit is broken, since the magnetic attraction between the arm 81 and bleeder element 83 exceeds the resilient restoring force upon the contact element and the element is held in a displaced position. At a later instant, determined solely by the operation of the balance wheel, the pallet lever 73 is engaged by the pin 76 and actuated toward its other limit position, and the combined force of the balance wheel and the contact element overcomes the magnetic force holding the pallet lever, allowing the displaced contact element to move against the commutator to re-establish the motor circuit. In addition, the energy stored in the resiliently mounted contact element, during its displacement by the rotating commutator, is imparted to the pallet lever and through the lever to the balance wheel, to make up for energy losses in the constant speed device.

The foregoing actions are repeated, in continued operation of the unit, so that twice during each cycle of operation of the constant speed device, the motor circuit is opened at instants determined by travel of the motor and closed at instants determined by operation of the balance wheel. The average speed of rotation is thus an exact function of balance wheel oscillations, although, at any given instant, the motor is either accelerating to a speed above, or decelerating to a speed below the desired, predetermined speed.

The motor-governor unit described herein is ideally suited for the operation of battery driven clocks, for example, since the unit is physically compact, relatively inexpensive to manufacture and highly dependable in its operation. Perhaps the most outstanding feature of the new motor-governor unit is its ability to operate over long periods of time, with high timing accuracy, using elementary forms of energy supply. Thus, motor-governor units constructed in close accord with device herein described, and of a size suitable for driving a clock mechanism, have been found to consume around 200 micro-watts of energy in operation and to govern accurately over a wide voltage range, from about 2.6 volts to about 0.6 volt. Accordingly, a typical motor-governor unit so constructed may be expected to operate for a period of as much as several years on a conventional 1.65 volt dry cell battery, of the type commonly used in flashlights, for example.

A highly important practical advantage of the new motor-governor unit resides in its ability to govern accurately over a wide voltage range. This ability enables the unit to be operated with simple dry cell batteries, the output or terminal voltage of which declines steadily through their useful lives. By way of contrast, conventional battery operated clock drives normally require special batteries, such as mercury cells, or at least expensive forms of dry cells, which have a relatively uniform terminal voltage during their useful lives.

It should be understood, however, that the specific form of the invention herein illustrated and described is intended to be representative only, as certain changes may be made therein without departing from the clear teachings of the disclosure. Accordingly, reference should be made to the following appended claims in determining the full scope of the invention.

We claim:

1. A motor-governor unit comprising a frame, a rotor journalled in said frame, magnetic means mounted on said frame and forming a stator, commutator means carried by said rotor, said commutator means being of eccentric cross section with respect to the axis of said rotor, a pair of resilient brushes anchored at points substantially removed from said rotor axis and extending generally toward and beyond said axis, said brushes passing on opposite sides of said rotor axis and pressing resiliently against said commutator, a balance wheel journalled in said frame, a pallet lever journalled in said frame and having one end engaged by said balance wheel and having a portion disposed between the extending portions of said brushes, said pallet lever being movable between operative limit positions by said balance wheel, and means including said magnetic means for releasably holding said pallet lever in operative positions, said pallet lever, brushes and commutator being so disposed and arranged that said pallet lever, when in an operative position, is adapted to hold a brush out of contact with said commutator.

2. The motor-governor unit of claim 1, in which said brushes extend substantially beyond said rotor axis, said balance wheel is journalled on an axis spaced from said rotor axis and on the side thereof toward which said brushes extend, and said pallet lever is pivoted on an axis between the balance wheel axis and said rotor axis.

3. The motor-governor unit of claim 1, in which said pallet lever carries a magnet thereon, and said magnet cooperates with said magnetic means for releasably holding said lever in operative positions.

4. The motor-governor unit of claim 3, in which the polarization of said magnet and magnet means is such that, when said pallet lever is in an operative position, a pole of said magnet is adjacent an opposite pole of said magnetic means.

5. In a motor-governor unit of the type having contact means opened at instants determined by the travel of a motor and closed at instants determined by a constant speed device, the improvement characterized by said constant speed device comprising a balance wheel, a pallet lever actuated between operative positions by said balance wheel, said lever being mounted for pivoting movement and having a magnet thereon movable with the lever, said magnet having its poles facing generally in the directions of movement of the magnet, and magnetic means of opposite polarity positioned on opposite sides of said magnet and adapted when said lever is actuated to an operative position to act on the magnet in a direction tending to retain said lever in its operative position.

6. The motor-governor unit of claim 5, in which said contact means includes a spring-like member, movable between circuit opening and circuit closing positions, and said magnet has a portion lying in the plane of movement of said spring-like member and adapted, when said lever is in one operative position, to engage said spring-like member and restrain its movement to circuit closing position.

7. The motor-governor unit of claim 5, in which said pallet lever is pivoted between its ends, said balance wheel acts upon one end of the lever, and said magnet is carried by the other end of said lever.

8. The motor-governor unit of claim 5, in which the motor comprises a rotor and stator, and the stator is formed by said magnetic means.

9. The motor-governor unit of claim 8, in which said magnet means comprises a pair of stator magnets of generally U-shaped cross section positioned on opposite sides of the rotor axis, the rotor lies between the legs of the stator magnets, and the stator magnets are reversely oriented whereby the north pole of one stator magnet and the south pole of the other stator magnet lie adjacent the same axial end of the rotor, and the magnet carried by said pallet lever lies between and is acted upon by the north pole of one stator magnet and the south pole of the other stator magnet.

10. In a motor-governor unit of the type having contact means opened at instants determined by the travel of a motor and closed at instants determined by a constant speed device, said constant speed device comprising a balance wheel, a pallet lever actuated between operative positions by said balance wheel, and magnet means operative temporarily to maintain said pallet lever in an operative position, the improvement characterized by said motor comprising a rotor and a pair of stator magnets, and said magnetic means comprising said stator magnets, said pallet lever having a magnetically responsive portion in operative proximity to said magnets whereby said lever is acted upon alternately by each magnet of the pair.

11. The motor-governor unit of claim 10, in which said pallet lever is pivoted about an axis spaced from the axis of said rotor, said stator magnets are positioned on opposite sides of the plane containing said axes, and said pallet lever has a portion extending toward the rotor axis and lying generally between said stator magnets.

12. The motor-governor unit of claim 11, in which bleeder elements are affixed to said stator magnets and extend toward said pallet lever.

13. In a small, low-current, electric motor for a cordless clock or the like and of the type having a wound coil rotor and a permanent magnet stator, the improvement characterized by said rotor having an effective portion of small axial length in relation to its diameter, said stator comprising a pair of opposed magnet assemblies comprising a bar of magnetic material disposed in right angular relation to the rotor axis and having poles facing in opposite directions parallel to said rotor axis, a pair of polar extension pieces separate from said bar but secured intimately to the poles of said bar and extending toward said rotor axis, said polar extension pieces having pole pieces disposed on opposite sides of the plane of rotation of said rotor and forming an air gap.

14. The motor of claim 13, in which the magnet bars of said magnet assemblies are of substantially greater thickness than the effective portions of said rotor, and said pole pieces are segments of arcuate shape offset toward the plane of rotation of the rotor and serving to concentrate the flow of flux across said air gap.

15. In the combination of a motor-governor unit of the type having motor circuit contacts opened at instants determined by the travel of a motor and closed at instants determined by the operation of a constant speed device, output means driven by said motor, and driven means operated by the output means, the improvement characterized by said motor-governor means being supported on a frame, said output means comprising a shaft journalled in said frame and having a portion projecting outward of said frame, said projecting portion having a drive pinion thereon, a bushing secured to and projecting from said frame and having a portion substantially surrounding the projecting portion of said shaft, said portion having an opening therein exposing a portion of said drive pinion, said driven means being mounted in frame means and including a gear adapted to mesh with said drive pinion, said frame means including a member having an opening receiving said bushing for positioning the projecting portion of said shaft in operative relation to said driven means, and means for securing said frame to said frame means.

16. The combination of claim 15, in which electrical connector elements are mounted in said frame, said connector elements are connected to said motor, and said frame means has connector elements cooperating with the first mentioned connector elements for supplying electrical energy to said motor-governor unit.

17. The combination of claim 15, in which said bushing partially surrounds said drive pinion and has a portion extending transversely and engaging the end of said shaft to form journal means therefor.

18. The combination of claim 15, in which said frame includes a base plate, said bushing extends through and projects from said base plate, electrical connector means extend through said base plate, and said frame means includes electrical connectors cooperating with said connector means.

19. A motor-governor unit comprising a frame, a rotor journalled in said frame, eccentric commutator means on said rotor, a pair of elongated brush contacts resiliently mounted in said frame and extending in spaced parallel relation toward and beyond said commutator, said brushes passing on opposite sides of said commutator and being urged resiliently toward the commutator, a pair of magnet bars mounted in said frame on opposite sides of said rotor and having their poles facing in opposite directions parallel to the axis of said rotor, a pair of polar extension pieces engaging the opposite poles of each magnet bar and having pole pieces overlying opposite axial end faces of said rotor, said magnet bars being reversely oriented one with respect to the other, a balance wheel journalled in said frame, a pallet lever journalled in said frame and having an end engageable with said balance wheel and movable thereby between limit positions, said pallet lever having a magnetic arm at its other end lying between said brush contacts, said magnetic arm having its poles facing in the directions of movement of said arm, magnetic means including said magnet bars adapted to coact with said magnetic arm to releasably retain said pallet lever in its limit positions, output means driven by said rotor and projecting from said frame, and a bushing partly surrounding the projecting portion of said output means and adapted for reception in a unit to be driven by the output means.

20. The motor-governor unit of claim 19, in which the frame comprises a base plate, a sub-frame secured to said base plate and journalling said balance wheel and pallet lever, and a rotor bridge journalling said rotor at one end and having a pair of spaced legs secured to said base plate and a V-shaped portion spanning said legs and having rotor journalling means at its apex.

21. The motor-governor unit of claim 20, in which anchor posts are received at one end in said base plate, an anchor bridge engages the other ends of said posts and is secured to said base plate, and said brush contacts are mounted by said anchor posts.

References Cited in the file of this patent

UNITED STATES PATENTS

| | | |
|---|---|---|
| 912,037 | Seidel | Feb. 9, 1909 |
| 2,456,967 | Livers | Dec. 21, 1948 |
| 2,523,298 | Haydon | Sept. 26, 1950 |
| 2,623,187 | Adams | Dec. 23, 1952 |
| 2,669,670 | Eggers | Feb. 16, 1954 |
| 2,717,350 | Brailsford | Sept. 6, 1955 |
| 2,753,501 | Brailsford | July 3, 1956 |
| 2,806,908 | Van Horn et al. | Sept. 17, 1957 |
| 2,840,773 | Kavanaugh et al. | June 24, 1958 |
| 2,853,637 | Kazuo Ishikawa | Sept. 23, 1958 |
| 2,916,641 | Held | Dec. 8, 1959 |

FOREIGN PATENTS

| | | |
|---|---|---|
| 362,793 | Italy | Sept. 5, 1938 |
| 544,346 | Germany | Feb. 12, 1932 |